J. W. RICHARDS.
GRAIN SCOOP.
APPLICATION FILED FEB. 8, 1915.
1,167,782. Patented Jan. 11, 1916.
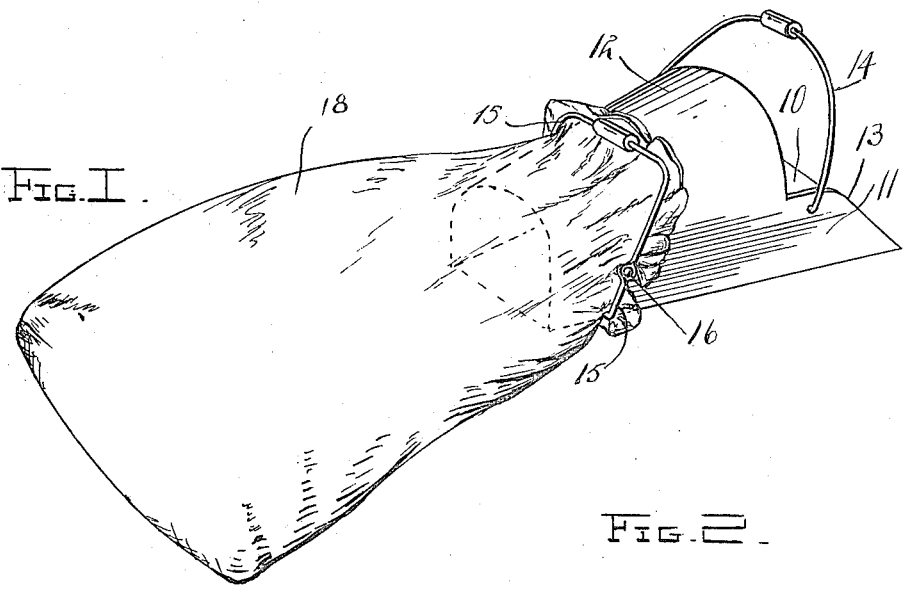
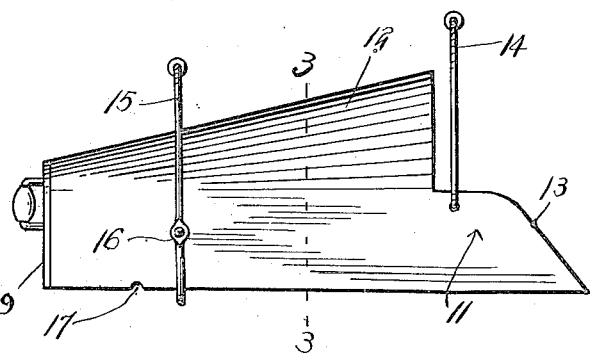
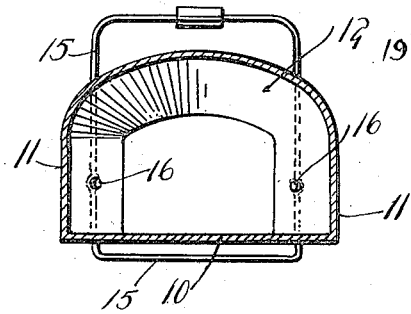
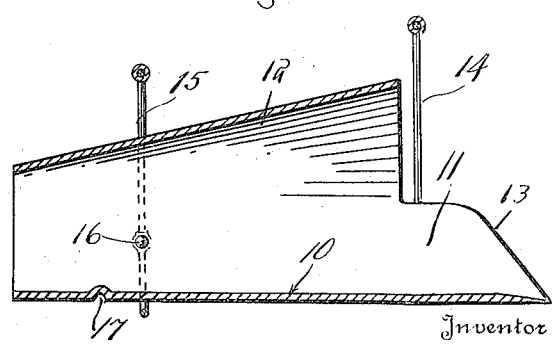
Inventor
J. W. Richards.

UNITED STATES PATENT OFFICE.

JAMES W. RICHARDS, OF WESTBOURNE, MANITOBA, CANADA.

GRAIN-SCOOP.

1,167,782.  Specification of Letters Patent.  Patented Jan. 11, 1916.

Application filed February 8, 1915. Serial No. 6,948.

*To all whom it may concern:*

Be it known that I, JAMES W. RICHARDS, a subject of the King of Great Britain, residing at Westbourne, in the Province of Manitoba, Dominion of Canada, have invented certain new and useful Improvements in Grain-Scoops; and I do hereby declare the following to be a full, clear, and exact description of the invention, such as will enable others skilled in the art to which it appertains to make and use the same.

This invention relates to improvements in bagging grain.

The principal object of the invention is to provide a simple and novel device of this character whereby one man can fill a bag with grain without any assistance.

Another object is to provide a simple and novel device whereby grain can be shoveled and deposited in the bag at a single operation.

Other objects and advantages will be apparent from the following description when taken in connection with the accompanying drawings; in which—

Figure 1 is a perspective view of my device showing the same in operative position, as a bag filler. Fig. 2 is an elevation of the device removed from the bag and adapted for use as an ordinary scoop. Fig. 3 is a vertical sectional view on the line 3—3 of Fig. 2, the cap being removed, and Fig. 4 is a vertical longitudinal sectional view through the device and a portion of the mouth of the bag.

Referring particularly to the accompanying drawings, there is shown a scoop-like structure which includes a flat bottom member 10 and vertical side members 11. Connecting the upper sides of the vertical side members is a rearwardly tapering arched member 12, the larger end of which is disposed at a suitable distance from the forward ends of the side members and terminates with the rear ends of said members. The forwardly projecting ends of said side members are downwardly and forwardly inclined as at 13, the bottom member 10 terminating at the lower ends of the said incline. Secured to the forwardly projecting portions of the side members near the upper edges thereof is an upwardly bowed handle or bail 14. Encircling the rear portion of the device is an approximately rectangular wire frame 15, the intermediate portions of the side members of which are pivotally connected to the side members 11 at 16. Both above and below the pivot pins, the frame is suitably spaced from the scoop, and formed transversely in the lower side of the bottom member rearwardly of the frame 15 is a groove 17, the same being disposed at such a point that the lower transverse portion of the frame 15 will enter the groove when said portion is swung rearwardly.

The rear end of the scoop is placed in the mouth of the bag 18 so that the lower portion thereof covers the groove 17. The upper portion of the frame 15 together with the upper portion of the bag is grasped in the left hand and pushed toward the forward end of the scoop so as to cause the lower end of the frame to force the lower portion of the mouth of the bag into the groove 17. The right hand grasps the handle or bail 14. The device is then used in the manner of a shovel or scoop and is pushed into the pile of grain to be bagged. As the scoop is pushed into the grain, the grain will pass through the scoop and out of the rear end into the bag. From time to time the scoop may be tilted into a vertical position to more readily permit the grain to flow into the bag. Thus the use of a second man to hold the bag while the first one shovels the grain thereinto is dispensed with, one man being able to shovel and fill the bag at one and the same time.

When the device is to be used as an ordinary scoop, a cap 19 is placed in the smaller end of the device, as seen in Fig. 2, this cap closing the end of the scoop. The scoop can then be manipulated in the same manner as heretofore mentioned, by grasping both handle members 14 and 15.

What is claimed is:

A device for filling a bag with grain comprising an open ended tapering scoop, the smaller end of which is arranged for disposition in the mouth of the bag, the bottom of the smaller end of the scoop having a transverse groove, means pivotally carried by the scoop for engagement in a portion of the bag and forcing the same into the groove, said means having an extension on the opposite side of the scoop from said groove, adapted to be grasped in one hand together with another portion of the mouth of the bag, and a handle on the forward end of the scoop arranged to be grasped with the other hand whereby the scoop can be plunged into a mass of grain and deliver the grain into the bag.

In testimony whereof, I affix my signature, in the presence of two witnesses.

JAMES W. RICHARDS.

Witnesses:
D. SMITH,
IRENE SCHOOLEY.